United States Patent Office 3,214,579
Patented Oct. 26, 1965

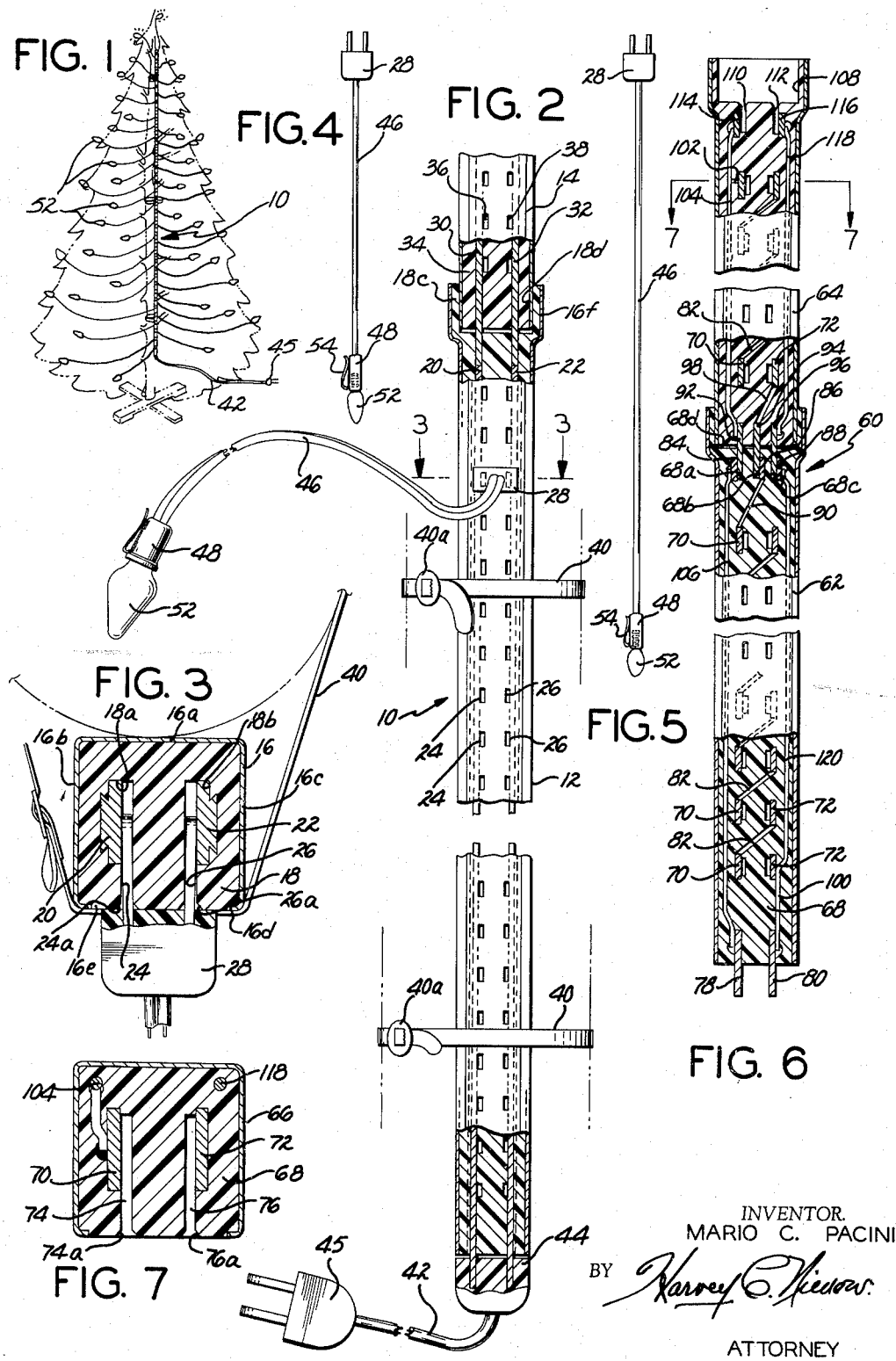

3,214,579
CHRISTMAS TREE LIGHTING SYSTEMS
Mario C. Pacini, 3000 Clay St., Newport Beach, Calif.
Filed Mar. 4, 1963, Ser. No. 262,404
1 Claim. (Cl. 240—10)

The present invention relates generally to Christmas tree lighting systems, and more particularly to lighting systems wherein the lead wires and other electrical conductors are relatively obscure.

It is a present-day custom, during the Christmas holiday season, to have a gaily lighted tree within or about one's home. Over the years, lighting systems for such trees have remained relatively unchanged. Virtually all such systems comprise a plurality of electrical lights or lamps which are connected in parallel or series circuit arrangement on suitable electrical lead wires. Such lamps generally are positioned along the lead wires in predetermined spaced relation, substantially without consideration of the size of tree or the length of the branches of the tree on which the system is to be used.

Prior lighting systems for Christmas trees merely reqiure the user to encircle the tree with the lead wires, attaching the individual lamps to the branches of the tree which are within reach. That is, in view of the fact that such prior systems had the lamps arranged in predetermined fixed spaced relation, such lamps could not be attached to predetermined branches but rather had to be connected to whatever branches or other parts of the tree happened to be available and within easy reach.

The overall effect of using such lighting systems was that frequently branches of the tree had to be bent or twisted so as to accommodate one of the lamps, or the electrical lead wires between two lamps were caused to sag and hang loosely between branches which were very close together. In any event, the result of using prior lighting systems was that the lead wires were very noticeable and obvious, and hence detracted greatly from the overall pleasing appearance of the lighted Christmas tree.

In view of the foregoing it is an object of the present invention to provide Christmas tree lighting systems wherein the various lead wires and other electrical conduits are virtually obscure.

Another object of the present invention is to provide such Christmas tree lighting systems wherein the lead wires and conduits are virtually removed from sight, and wherein such systems can be adapted to virtually any size or shape of tree.

Another object of the present invention is to provide Christmas tree lighting systems as characterized above wherein the individual lamps are connected in either parallel or series circuit arrangement, as desired.

A further object of the present invention is to provide Christmas tree lighting systems as characterized above wherein a central distribution means is provided adjacent the trunk of the tree, and wherein branch circuits extend along the individual branches of the tree.

Another object of the present invention is to provide a Christmas tree lighting system wherein all of the lead wires and electrical conduits are positioned adjacent the branches or trunk of the tree so as to be virtually obscure to the casual viewer of the lighted tree.

A further object of the present invention is to provide Christmas tree lighting systems as characterized above which are simple and inexpensive to manufacture, and which are rugged and dependable in operation.

The novel features which I consider characteristic of my invention are set forth with particularly in the appended claims. The device itself, however, both as to its organization and mode of operation, together with additional objects and advantages thereof, will best be understood from the following description of specific embodiments when read in connection with the accompanying drawings, in which:

FIGURE 1 is an elevational view of a lighting system according to the present invention, shown mounted on a Christmas tree;

FIGURE 2 is a fragmentary sectional view of a portion of one embodiment of the present invention;

FIGURE 3 is a fragmentary sectional view taken substantially along line 3—3 of FIGURE 2;

FIGURE 4 is an elevational view of a relatively short branch circuit;

FIGURE 5 is an elevational view of a relatively long branch circuit;

FIGURE 6 is a fragmentary sectional view of a portion of a second embodiment of the present invention; and FIGURE 7 is a sectional view taken substantially along line 7—7 of FIGURE 6 of the drawings.

Like reference characters indicate corresponding parts throughout the several views of the drawings.

Referring to FIGURES 2 and 3, there is shown therein a portion of one embodiment for illustration of the present invention. FIGURE 2 shows an elongated distribution means 10 which comprises two or more distribution members 12 and 14. As will hereinafter become more apparent to those persons skilled in the art, distribution means 10 may comprise only a single distribution member, such as member 12, or it may be formed of any desired number of such members. The number of distribution members employed in a given system is governed by the size of the tree to be lighted and the length of the individual distribution members.

Distribution member 12 comprises a generally U-shaped housing member 16 having a rear wall 16a connected to side walls 16b and 16c. The front wall 16d of housing member 16 is provided with an elongated slot or opening 16e which extends the entire length of the distribution member to provide the generally U-shape configuration. Housing member 16 may be formed of any appropriate materials such as plastic, metal, or the like.

An elongated insulating member 18 is positioned within housing 16.

The upper end portion 16f of housing member 16 is enlarged or flared to assist in providing a receptacle for distribution member 14, as will hereinafter become more apparent.

Position within housing member 16 is an elongated insulating member 18 which extends the entire length of member 16. Insulating member 18 is exposed through the elongated slot 16e of housing member 16 and, as will be readily apparent to those persons skilled in the art, may be molded within housing member 16 or may be inserted therewithin after having been pre-formed.

Extending the entire length of insulating member 18 is a pair of slots or grooves 18a and 18b for receiving elongated electrical conductors 20 and 22, respectively. The slots 18a and 18b may be formed as desired to receive and retain the electrical conductors. As shown in FIGURE 3, such slots may be dove-tailed to receive complementally formed portions of the conductors. However, any appropriate means may be employed for this purpose, the only objective being to hold the elongated conductors 20 and 22 in relatively fixed spaced positions within the insulating member.

Conductors 20 and 22 may be formed of any appropriate material having good electrical conductivity such as copper, aluminum or alloys thereof.

Insulating member 18 is further formed with a plurality of pairs of apertures 24 and 26 in spaced relation along the length of the distribution member 12. Such apertures are positioned to cooperate with slots 18a and 18b. That is, such apertures are so positioned in insulating member 18 that conducting prongs may be inserted into the apertures so as to make contact or engagement with the conductors 20 and 22. In this regard, apertures 24 and 26 should be so spaced as to receive the conducting prongs or terminals of an ordinary household plug or connector 28 as will hereinafter be explained in greater detail.

As shown most clearly in FIGURE 2 of the drawings, the various pairs of apertures 24 and 26 are spaced along the entire length of the distribution member 12 to provide corresponding member of receptacles for such electrical plugs. To facilitate receipt of such plugs, each of the apertures is flared or tapered as at 24a and 26a respectively, as shown most clearly in FIGURE 3 of the drawings.

The upper end portion 18c of insulating member 18 is recessed as at 18d to accommodate one end of distribution member 14 as will hereinafter appear. The upper end portions of the electrical conductors 20 and 22 are spaced from the recess 18d of insulating member 18, although the slots 18a and 18b communicate with such recess.

The lower end of conductors 20 and 22 extend beyond the lower end of insulating member 18. However, such extended portions are not provided with the dove-tail configuration described above for anchoring the conductors within such insulating member.

The distribution member 14 is of substantially identical construction with distribution member 12, having a pair of conductors 30 and 32 operatively positioned within an insulating member 34 as above described with respect to member 12. Also, distribution member 14 is provided with a plurality of pairs of openings or apertures 36 and 38 for receiving an electrical connector or plug as above described.

The distribution members 12 and 14 are intended to be substantially identical so as to be freely interchangeable. The two members are assembled by inserting the lower end of distribution member 14 within the recess 18d in the upper end portion of distribution member 12. In so doing, the lower end portion of the conductors 30 and 32 are inserted into the elongated slots 18a and 18b until engagement is made with the upper end portions of conductors 20 and 22. To provide good electrical contact therebetween it is preferable to have conductors 30 and 32 engage conductors 20 and 22 before insulating member 34 engages the bottom of recess 18d.

As shown most clearly in FIGURE 1 of the drawings, the various distribution members 12 and 14 which are contiguously arranged to provide the distribution means 10 are fastened to one side of the trunk of the tree to be lighted. To insure that the distribution means 10 is inconspicuous, it is preferable to position such distribution means on the rear side of the trunk. That is, such distribution means should be positioned adjacent the trunk of the tree on the side thereof which is removed from the most prevalent direction of view.

To retain such distribution means in assembled relation on the tree, it is contemplated that any appropriate fastening means such as straps or belts 40 may be used. The straps are positioned about the distribution means 10 and the tree trunk adjacent thereto. If desired, the strap 40 may be provided with an appropriate buckle or clasp 40a for retaining the distribution means 10 and the tree trunk in fixed relation.

Attached to the lower end of distribution means 10 is a flexible conduit 42, on one end of which is an ordinary female electrical plug 44. Plug 44 is constructed to receive the lower end portion of conductors 20 and 22 of distribution member 12 as shown most clearly in FIGURE 2.

The other end of flexible conduit 42 is provided with the usual male type electrical plug 45 to be inserted into a household electrical outlet. As a result of this arrangement, the distribution means 10 is energized throughout its entire length.

Once the distribution means 10 has been properly positioned, as above described, it is then merely necessary to select the proper branch circuits in accordance with the various lengths of the branches of the tree. That is, each branch circuit as shown in FIGURES 4 and 5, comprises a pair of electrical lead wires 46 to one end of which a lamp-receiving socket 48 is applied. The other end of the lead wires 46 is provided with one of the electrical connectors or plugs 28.

Socket 48 is formed with fastening threads or other appropriate fastening means for receiving an electrically energizable lamp 52. Also, socket 48 may have suitable clip means, as shown at 54, for fastening the socket to the branch of a tree.

As shown in FIGURES 4 and 5, a Christmas tree lighting system includes a plurality of branch circuits of various lengths. For instance, the lead wires 46 of the branch circuit of FIGURE 4 is shorter than the lead wires 46 of the circuit shown in FIGURE 5. Thus, the branch circuits are particularized for the various branches of the tree.

Thus, it is a simple matter to select the proper branch circuit for each branch of the tree. The plug 28 of each branch circuit is inserted into the pair of apertures 24 and 26, or 36 and 38 nearest the branch of the tree to which it is to be applied. The lead wires 46 are then positioned adjacent the particular branch, and the lamp socket 48, by means of its retaining means 54, is then secured to the branch of the tree, as desired.

By following the above explained procedure for each of the branches of the tree, it is seen that a lighting system is provided whereby each branch is provided with an individual electrically energizable lamp.

The aforedescribed system connects all of the electrical lamps 52 in parallel circuit arrangement. That is, since each plug 28 engages both conductors 20 and 22, or 30 and 32, and since each of such conductors is connected directly to one side of the source of electrical energy, all of the devices connected to the distribution means 10 are thereby connected in parallel circuit arrangement.

In the event it is desired to use lamps which are constructed to be connected in series, the embodiment of the present invention shown in FIGURES 6 and 7 may be employed.

This embodiment is formed with distribution means 60 comprising one or more pairs of distribution members 62 and 64. Distribution member 62 comprises a generally U-shaped elongated housing 66 on the order of the above described housing member 16. Within housing member 66 is an elongated insulating member 68 which is exposed through the elongated opening in the front wall of the housing member.

Positioned within insulating member 68 is a plurality of pairs of electrical contacts 70 and 72, such pairs being in spaced relation along the entire length of distribution member 62. Aligned with such pairs of contacts 70 and 72 are suitable apertures 74 and 76 corresponding to the apertures 24 and 26 of distribution member 12 of the first embodiment. The apertures 74 and 76 are provided with flared or tapered end portions 74a and 76a respectively for receiving the terminals of an electrical plug 28.

Embedded in insulating member 68 at the lower end of distribution member 62 are terminal members 78 and 80. Such terminal members are of such length and are so positioned in insulating member 68 as to receive an electrical plug member as shown at 44 in FIGURE 2.

As shown in FIGURE 6 of the drawings, an electrical conductor 82 is connected between contact 70 and contact 72 of adjacent pairs of contacts. As will be readily apparent to those persons skilled in the art, such conductors connect the various pairs of contacts in series circuit arrangement such that whatever devices, such as electrical lamps, are connected across such contacts, they too will be arranged in series.

As shown in FIGURE 6, it may be found desirable to provide a continuous series circuit in two separate distribution members 62 and 64 to minimize the length of the various distribution members for ease in packing, shipping and handling. In this event, three longitudinal openings 68a, 68b and 68c are formed in the upper end portion of insulating member 68 in communication with a longitudinal recess 68d therein. Within each such opening is a contact 84, 86 and 88, respectively. A conductor 90 is embedded in the insulating member 68 to interconnect the uppermost electrical contact 70 of distribution member 62 with contact 86 in opening 68b.

The upper distribution member 64 is provided with three terminal members 92, 94 and 96 for insertion within the openings 68a, 68b and 68c, respectively.

Such distribution member is also provided with a plurality of pairs of electrical contacts 70 and 72, such pairs being in spaced relation along the length of such member.

Terminal member 94 is connected to the contact 72 of the lowermost pair of contacts of the distribution member 64 by a conductor 98. Above that, each contact 70 is connected, by means of a conductor 82, to the contact 72 of the superjacent pair of contacts.

Thus, the above described arrangement and interconnection of contacts, causes all of the pairs of contacts in both distribution members 62 and 64 to be connected in series circuit arrangement. That is, all of the pairs of contacts from the lowermost pair of contacts in distribution member 62 to the uppermost pair of contacts in distribution member 64 are connected in a single series circuit.

To bring electrical energy from a suitable source of power to the various pairs of contacts, a conductor 100 is connected, as by soldering or the like, between terminal member 80 and the lowermost contact 72 in distribution member 62. The uppermost contact 70 in distribution member 64 is connected by means of a conductor 102 to a conductor 104 which extends the entire length of distribution member 64. The lower end of conductor 104 is connected to terminal member 92 which cooperates with opening 68a of member 62 when the distribution members are in assembled relation.

Positioned within the insulating member 68 and extending the entire length of distribution member 62 is a conductor 106 the upper end of which is electrically connected to contact 84 while the lower end is connected to terminal member 78. It is thus seen that a series circuit is provided from terminal member 80 to terminal member 78 through all of the pairs of contacts in members 62 and 64.

To enable an additional distribution member 62 to be contiguously arranged with the upper end of member 64, a recess 108 is provided in such upper end portion. Also, member 64 is provided with a pair of longitudinal openings 110 and 112 for receiving terminal members 78 and 80 at the lower end of the additional distribution member 62.

The upper end of conductor 104 is secured to a contact 114 embedded in the insulating member of distribution member 64 for exposure through opening 110. In like manner, another contact 116 is provided in the upper end of the insulating member of distribution member 64 for exposure through opening 112. The latter contact is connected in circuit with terminal member 96 at the lower end of member 64 by a conductor 118. To complete the circuit, contact 88 in the upper end portion of member 62 is connected to terminal member 80 at the lower end thereof by a conductor 120 and the aforedescribed conductor 100.

The aforedescribed arrangement not only connects the various pairs of contacts in members 62 and 64 in series, but the upper end portion of member 64 is constructed to permit additional distribution members to be contiguously arranged thereof to provide distribution means of any desired length. It should be particularly noted that the additional distribution members will not have their contacts in series with the contacts 70 and 72 shown in FIGURE 6, but rather such additional contacts will be in series with each other but in parallel circuit arrangement with the pairs of contact shown in such drawing. That is, the circuit comprising conductor 100, conductor 120, contact 88, terminal member 96, conductor 118 and contact 116 connects one side of the source of electrical energy to the contacts of the additional pair of distribution members. In like fashion, the circuit comprising contact 114, conductor 104, terminal member 92, contact 84, and conductor 106 connects such additional contacts to the other side of the source.

It is thus seen that the present invention teaches various different arrangements for connecting the contacts in series, parallel or any combination thereof.

As will be readily understood by those persons skilled in the art, distribution means 60 is positioned adjacent the trunk of the tree as above described with respect to distribution means 10 of the first embodiment. Thereafter, the various branch circuits as shown in FIGURES 4 and 5 are connected to the distribution means 60 whereby by insertion of the various plugs 28 into the pairs of apertures 74 and 76. To complete the entire series circuits, it may be necessary to employ additional branch circuits or electrical bridging units. That is, since the various contacts of each pair of members 62 and 64 are arranged in series, it is necessary that all of the pairs of contacts be bridged before any of the lights will be energized. Suitable means can be provided to accomplish this.

The subject lighting systems are adapted to receive virtually any type of electrically energizable lamps. That is, in addition to the lamps which have to be arranged in parallel of series as above described, the subject circuits can also accommodate those lamps which are to be arranged in series but continue to complete the series circuit whenever a given lamp burns out. Such lamps include means responsive to opening of the filament thereof to complete an auxiliary circuit across the contacts so that the series circuit remains uninterrupted.

The subject lighting circuits also are adapted for substantially any size Christmas tree lamps. That is, such lamps can be extremely small as used on miniature tress, or can be larger up to the size normally used on outdoor trees.

Although I have shown and described certain specific embodiments of my invention, I am fully aware that many modifications thereof are possible. My invention, therefore, is not to be restricted except insofar as is necessitated by the prior art and by the spirit of the appended claim.

I claim:

A Christmas tree lighting system comprising in combination, electrical distribution means to be arranged along the trunk of a Christmas tree substantially throughout its length and comprising a plurality of contiguously arranged sections each of which includes an elongated insulating member formed with a pair of spaced slots which extend the length of said sections and a metallic housing at least partially enclosing said insulating member, each of said slots being formed with a pair of oppositely disposed side walls and an end wall, one of said side walls in each of said slots being formed with a generally dove-tail configuration throughout its length, said distribution means further including an elongated conductor in each of said slots having a mounting portion formed complimentally of said dove-tail configuration of the respective slot and inserted therein to retain said conductor in fixed position, each of said conductors having a continuous surface substantially aligned with the respective side wall of the slot to cooperate therewith to provide a generally U-shaped slot, one end of each said sections having its electrical conductors extending therebeyond for insertion into the adjacent end of the contiguously arranged section, the opposite end of each of said sections having the insulating member and housing thereabout flared outwardly to form an end-wise recess removably receiving the adjacent end of the contiguously arranged section, said recess having an annular shoulder of such size and shape as to firmly receive said adjacent end of the contiguous section, the flared end of said metallic housing about said annular shoulder providing strength therefor to properly support the same in assembled relation, and a plurality of branch circuits individualy provided with a male electrical plug removably inserted into said slots in said insulating member and having an electrical lamp, whereby said plugs are caused to engage said conductors in said insulating member to complete the energizing circuit therefrom to said respective electrical lamps.

References Cited by the Examiner

UNITED STATES PATENTS

| | | | |
|---|---|---|---|
| 1,885,513 | 11/32 | De Mask | 339—21 |
| 2,117,816 | 5/38 | Ness | 339—21 |
| 2,146,829 | 2/39 | MacFarlane et al. | 339—21 |
| 2,219,568 | 10/40 | Stewart. | |
| 2,277,532 | 3/42 | Smith | 240—10 X |
| 2,533,222 | 12/50 | Cohen | 240—10 |
| 2,875,421 | 2/59 | Jordan | 240—10 X |
| 3,120,351 | 2/64 | Kirsten | 240—10 |

FOREIGN PATENTS 615,231   2/61   Canada.

NORTON ANSHER, *Primary Examiner.*